J. GOLDSTEIN & L. STEINER.
CIRCUIT CLOSER FOR SPEED INDICATORS.
APPLICATION FILED JUNE 13, 1914.
1,149,042.
Patented Aug. 3, 1915.
2 SHEETS—SHEET 1.
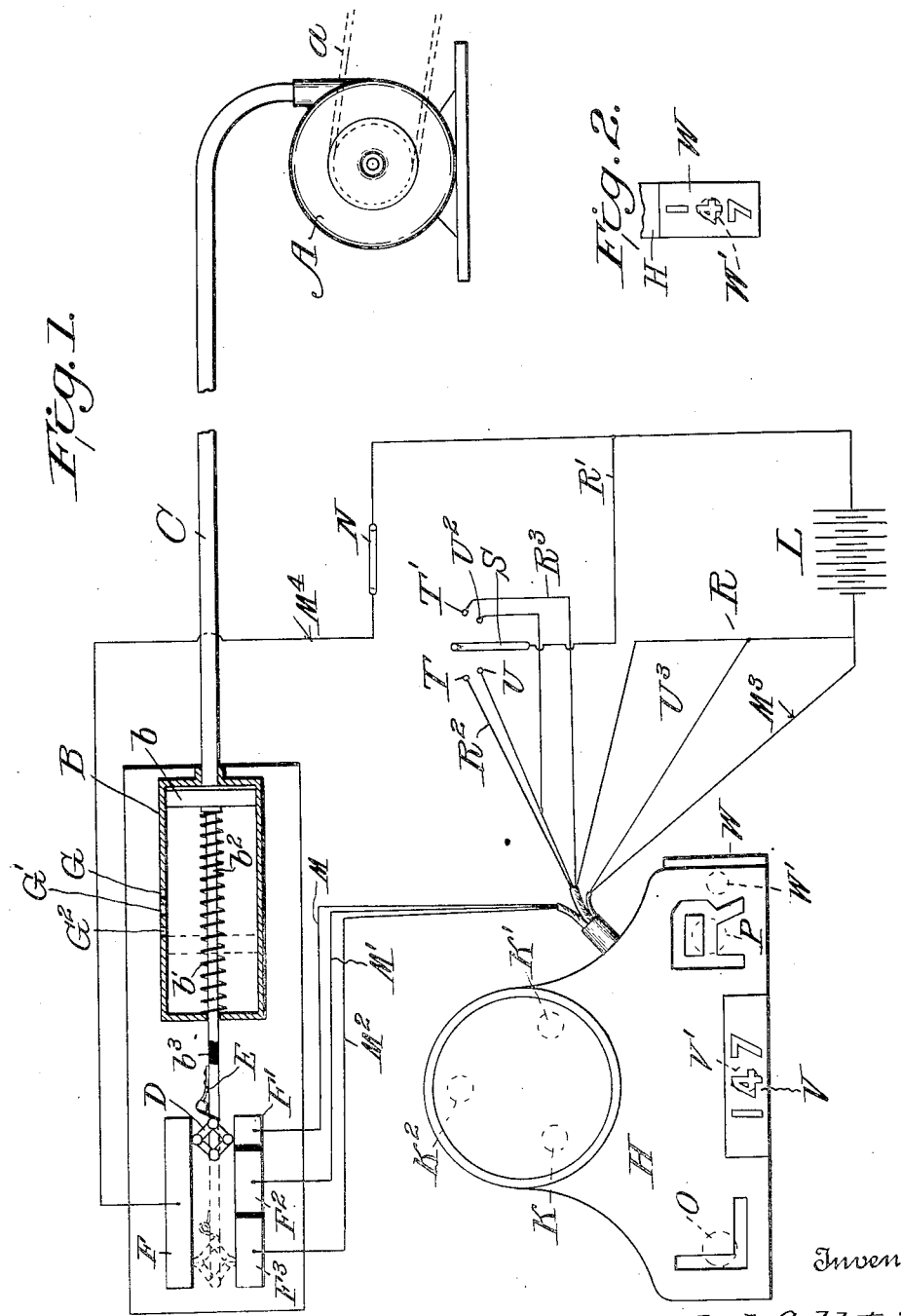

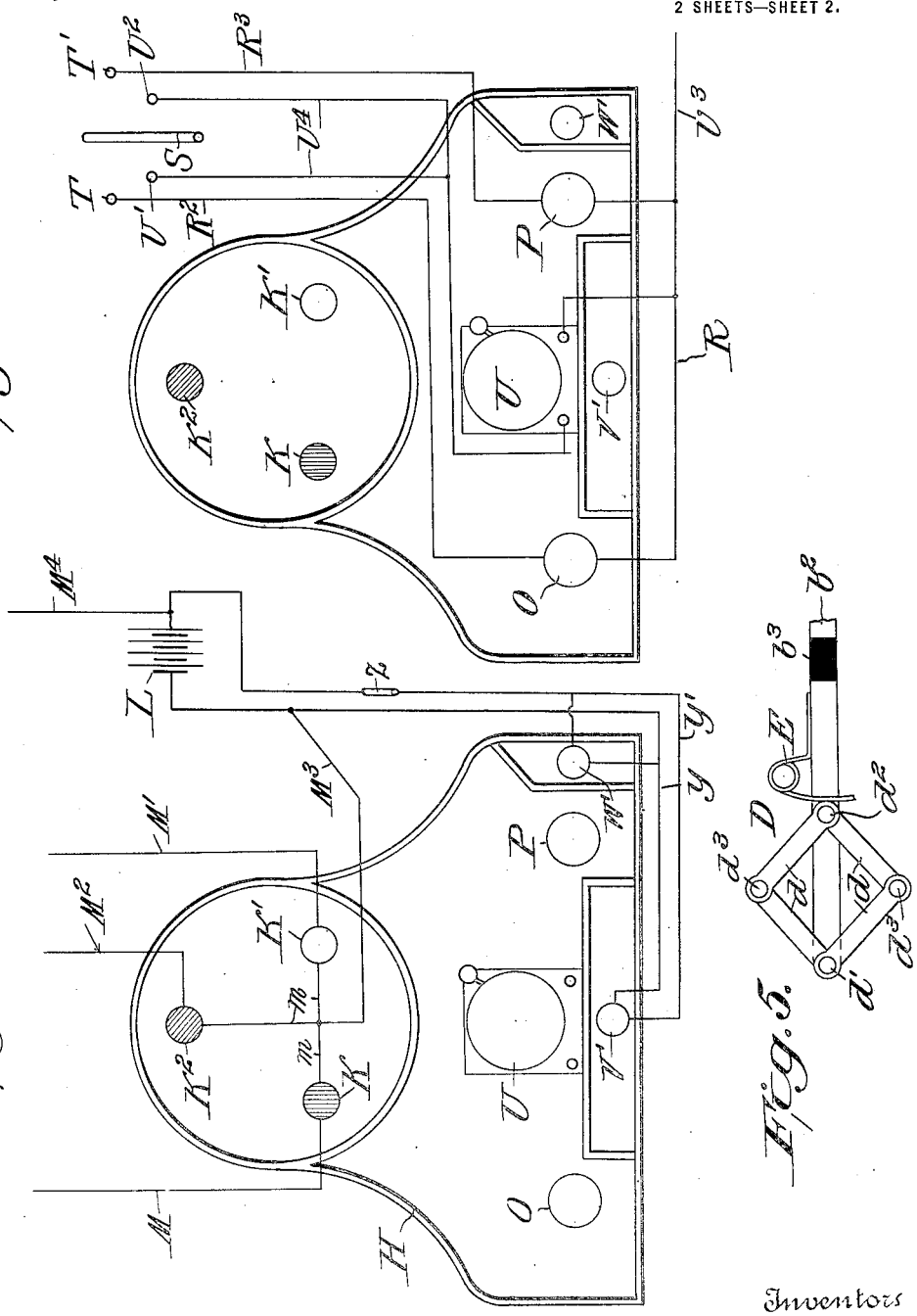

UNITED STATES PATENT OFFICE.

JACOB GOLDSTEIN AND LOUIS STEINER, OF NEW YORK, N. Y.

CIRCUIT-CLOSER FOR SPEED-INDICATORS.

1,149,042.  Specification of Letters Patent.  Patented Aug. 3, 1915.

Application filed June 13, 1914. Serial No. 845,010.

*To all whom it may concern:*

Be it known that we, JACOB GOLDSTEIN and LOUIS STEINER, citizens of the United States, residing at New York, in the county and State of New York, have invented a new and useful Circuit-Closer for Speed-Indicators, of which the following is a full, clear, and exact specification.

This invention relates to automobile signals, and has for its object to provide improved and simplified means for indicating the speed of the vehicle, that is, whether it has stopped, is moving at slow speed, or at normal speed.

A further object is to accomplish this result automatically and in a reliable and economical manner, whereby the signal displayed will be positively controlled by the actual speed of the vehicle, and that without the consumption of a considerable amount of electricity.

Another object is to provide means for indicating an intended turn to the left or right, and to sound an alarm simultaneously when giving either of these signals in order to direct the attention of persons in the locality to such indicating device or signal.

Other objects will appear as the description proceeds.

The invention will be first hereinafter described in connection with the accompanying drawings, which constitute a part of this specification, and then more particularly defined in the claims at the end of the description.

In the accompanying drawings, wherein similar reference characters are used throughout the several views to designate corresponding parts:—Figure 1 is a general view of a signal constructed in accordance with the present invention, partly diagrammatic, and the compressed-air cylinder being shown in section. Fig. 2 is an end view of the signal casing, showing the side license plate. Fig. 3 is an enlarged diagrammatic view of the casing, showing the circuits to the speed indicator lamps, and Fig. 4 is a similar view showing the circuits to the right and left signal lamps and to the bell. Fig. 5 is a detailed view of the contact member carried by the piston stem.

In Fig. 1, A indicates a blower or compressor which may be connected to the driving shaft of an automobile (not shown) by a suitable driving connection $a$, shown in dotted lines. The blower or compressor will, therefore, be operated whenever the automobile is in motion, and its speed will be positively controlled by the speed of the vehicle.

Mounted at some convenient place on the vehicle is a cylinder B connected at one end with the blower or compressor A by a tube C. Within the cylinder, a piston or plunger $b$ is adapted to move under the influence of compressed air from the blower, against the tension of a spring $b'$ which is coiled about the stem $b^2$ and normally tends to hold the piston at the end of the cylinder which is entered by the pipe C. The stem $b^2$ projects from the other end of the cylinder and carries at or near its extremity a resilient contact device D adapted to move between a pair of contact plates arranged parallel to the line of movement of the piston and its stem. The stem of the piston may be made angular in cross-section to prevent it from turning. The end of the stem which carries the contact member D is separated from the other part of said stem by insulation, as at $b^3$. The contact member D may comprise a plurality of links $d$, preferably four connected end to end into a general rectangular form. The connecting pin $d'$ for two of the links is fixed to the stem $b^2$, while the diametrically opposite connecting pin $d^2$ is free to slide along the stem and is pressed by a spring E for yieldingly holding the other two connecting pins $d^3$ in contact with the parallel contact plates hereinbefore mentioned. One of the parallel contact plates is made in three parts F', F² and F³ which are insulated from one another. The other parallel contact plate F is made in a single piece extending the full length of the three opposite contact plates F', F² and F³.

The cylinder B is provided with a series of vent openings, preferably three, G, G' and G², which are arranged at proper intervals and suitably located along the cylinder so that said openings will be successively uncovered by the piston as the latter is moved to bring the contact member D opposite the contact plates F', F² and F³. When the piston has passed the last of the three vent openings, G², and the contact member D is arranged opposite the contact plate F³, as shown in dotted lines in Fig. 1, a sufficient quantity of compressed air will be allowed to escape through the three vent openings to prevent a further movement of the piston against the influence of the spring $b'$, On the back of the vehicle there is attached a casing H having a "bull's eye" or other suitable opening within which are arranged three differently colored electric lamps corresponding to the three contact plates F', F² and F³. The lamp K which corresponds to the contact plate F', is red. The lamp K' which corresponds to the contact plate F² is white, while the lamp K² which corresponds to the contact plate F³ is green. It will be understood, of course, that while the colors indicated are preferable, any others which are readily distinguishable from one another may be employed, if desired. Referring to Figs. 1 and 3, electric connections are made from a battery or generator L to the three speed indicating lamps K, K' and K², and to the contact plate F, F', F² and F³, as follows: Wires or conductors M, M' and M² run from the respective lamps K, K' and K² direct to the contact plates F', F² and F³ respectively. A wire or conductor M³ runs from one terminal of the battery L and branches, as at $m$, to the other terminal of each of the lamps K, K' and K², while another wire or conductor M⁴ leads from the other terminal of the battery to the contact plate F. It will thus be seen that the contact member D will complete the circuit through one or another of the lamps according to the position of said contact member which is controlled by the piston $d$. Thus, when the vehicle is stopped, the piston is at the right hand end of the cylinder and the contact member D engages the contact plate F' and completes the circuit through the red lamp K which is used as a signal for indicating that the vehicle is not moving. When the vehicle is moving at slow speed the compressed air furnished by the blower or compressor A, will force the piston $b$ to an intermediate position, moving the contact member D into engagement with the contact plate F², when the circuit will be completed through the white lamp K', which is used to indicate slow speed. When the vehicle is running at normal speed the air compressed by the blower will be at higher tension and will force the piston beyond the vent openings G, G' and G², and bring the contact member D into contact with the contact plate F³ thereby closing the circuit through the green lamp K² which is used to indicate that the vehicle carrying the signal is moving at normal speed. It will be noted that as the blower is connected up with the driving shaft of the automobile, every change of speed of the latter must necessarily be communicated to said blower, so that an increase in speed of the vehicle will increase the velocity of the blower and correspondingly increase the pressure valve supplied to the cylinder B by said blower. Consequently, the speed indicating lamps are positively controlled by the actual speed of the vehicle. One of the wires or the conductors in the circuits to said speed indicating lamps, as the wire M⁴, may be provided with a switch N for interrupting said circuits during the daylight hours or when the vehicle is not in use. The casing H may be further provided with cut out signals "L" and "R" which when illuminated will indicate an intended turn to the left or right, respectively. Referring to Figs. 1 and 4, O designates an electric lamp arranged in the casing H near the signal "L," and P designates a similar lamp arranged in the casing adjacent the signal "R." The circuits to these lamps O and P include the battery L, wires R and R' leading from opposite terminals of the battery to the lamps and to a switch arm S, respectively, and other wires R² and R³ leading, respectively, from the lamps O and P to contacts T and T' arranged within the sweep of the switch arm S. An alarm bell U may also be placed in the casing and connected up with the battery L and with contacts U' and U² located adjacent the contacts T and T', respectively. The contacts T and U' are adapted to be simultaneously engaged by the switch arm S, as are also the contacts T' and U², so that the alarm will be sounded when either of the lamps O or P is lighted. These right and left signal lamps are controlled by the driver from the switch arm S which is arranged in convenient reach on the vehicle. The connection from the battery to the bell is through a wire U³, while a wire U⁴ leads from said bell and branches to the contacts U' and U². Provision may also be made on the casing for displaying the license number both at the rear and at the side. The rear license plate V is provided with an electric lamp V', while the side license plate W, which is arranged at the end of the casing, is illuminated by an electric lamp W'. The lamps V' and W' are in direct circuit with the battery via wires Y and Y' in order that these lamps may be kept constantly burning. One of the wires Y or Y' may have a switch Z for cutting off the current to these lamps in the daytime or when the vehicle is not in use.

Having thus described our invention, what we claim as new and desire to secure by Letters Patent of the United States is:—

1. A circuit closer for speed indicators comprising a pair of parallel contact plates, one of which is sectional and the other continuous, electric signal circuits to said contact plates, and a contact member movable between said contact plates for successively closing said circuits, said contact member comprising a plurality of links yieldingly held in extended position to take up any irregularities or wear in the contact plates.

2. A circuit closer for speed indicators comprising a pair of parallel contact plates, one of which is sectional and the other continuous, electric signal circuits to said contact plates, a member movable between said contact plates, a series of links pivoted end to end in rectangular formation, the pivot of two of said links being fixed to said movable member, and resilient means pressing against the diametrically opposite pivot for yieldingly holding the other two pivots in contact with said contact plates.

3. A circuit closer for speed indicators comprising a pair of parallel contact plates, one of which is sectional and the other continuous, electric signal circuits to said contact plates, a member movable between said contact plates but out of contact therewith, a series of links pivoted end to end in rectangular formation, the pivot of two of said links being fixed to said movable member, and resilient means pressing against the diametrically opposite pivot for yieldingly holding the other two pivots extended beyond the sides of said movable member and in contact with said contact plates.

In testimony whereof we have signed our names to this specification in the presence of two attesting witnesses.

JACOB GOLDSTEIN.
LOUIS STEINER.

Witnesses:
E. STEUERNAGEL,
WM. M. CHRISTIE.